US006543234B2

(12) United States Patent
Anand et al.

(10) Patent No.: US 6,543,234 B2
(45) Date of Patent: Apr. 8, 2003

(54) COMPRESSOR DISCHARGE BLEED AIR CIRCUIT IN GAS TURBINE PLANTS AND RELATED METHOD

(75) Inventors: Ashok Kumar Anand, Niskayuna, NY (US); Philip Fadhel Berrahou, Latham, NY (US); Michael Jandrisevits, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/153,609

(22) Filed: May 24, 2002

(65) Prior Publication Data

US 2002/0129608 A1 Sep. 19, 2002

Related U.S. Application Data

(62) Division of application No. 09/659,687, filed on Sep. 11, 2000, now Pat. No. 6,442,941.

(51) Int. Cl.[7] ................................................. F02C 6/18
(52) U.S. Cl. ...................................... 60/772; 60/39.182
(58) Field of Search ........................... 60/39.183, 39.23, 60/39.5, 262, 772, 785, 795

(56) References Cited

U.S. PATENT DOCUMENTS

| 3,288,373 | A | * | 11/1966 | Pike ............................. 60/262 |
| 3,641,766 | A | * | 2/1972 | Uehling ........................ 60/262 |
| 3,659,417 | A | * | 5/1972 | Grieb ........................... 60/785 |
| 3,998,047 | A | * | 12/1976 | Walker ........................ 60/39.23 |
| 4,907,406 | A | | 3/1990 | Kirikami et al. |
| 6,065,283 | A | | 5/2000 | Shouman |

FOREIGN PATENT DOCUMENTS

| BE | 547127 | 5/1956 |
| JP | 6-66155 A | 3/1994 |

OTHER PUBLICATIONS

"39[th]GE Turbine State-of-the-Art Technology Seminar", Tab 1, "F" Technology –the First Half–Million Operating Hours, H.E. Miller, Aug. 1996.

"39th GE Turbine State-of-the-Art Technology Seminar", Tab 2, "GE Heavy–Duty Gas Turbine Performance Characteristics", F. J. Brooks, Aug. 1996.

"39th GE Turbine State-of-the-Art Technology Seminar", Tab 3, "9EC 50Hz 170–MW Class Gas Turbine", A.S. Arrao, Aug. 1996.

"39th GE Turbine State-of-the-Art Technology Seminar", Tab 4, "MWS6001FA –An Advanced–Technology 70–MW Class 50/60 Hz Gas Turbine", Ramachandran et al., Aug. 1996.

"39th GE Turbine State-of-the-Art Technology Seminar", Tab 5, "Turbomachinery Technology Advances at Nuovo Pignone", Benvenuti et al., Aug. 1996.

"39th GE Turbine State-of-the-Art Technology Seminar", Tab 6, "GE Aeroderivative Gas Turbines –Design and Operating Features", M.W. Horner, Aug. 1996.

(List continued on next page.)

Primary Examiner—Louis J. Casaregola
(74) Attorney, Agent, or Firm—Nixon & Vanderhye P.C.

(57) ABSTRACT

A gas turbine system that includes a compressor, a turbine component and a load, wherein fuel and compressor discharge bleed air are supplied to a combustor and gaseous products of combustion are introduced into the turbine component and subsequently exhausted to atmosphere. A compressor discharge bleed air circuit removes bleed air from the compressor and supplies one portion of the bleed air to the combustor and another portion of the compressor discharge bleed air to an exhaust stack of the turbine component in a single cycle system, or to a heat recovery steam generator in a combined cycle system. In both systems, the bleed air diverted from the combustor may be expanded in an air expander to reduce pressure upstream of the exhaust stack or heat recovery steam generator.

9 Claims, 4 Drawing Sheets

OTHER PUBLICATIONS

"39th GE Turbine State–of–the–Art Technology Seminar", Tab 7, "Advance Gas Turbine Materials and Coatings", P.W. Schilke, Aug. 1996.

"39th GE Turbine State–of–the–Art Technology Seminar", Tab 8, "Dry Low $NO_x$ Combustion Systems for GE Heavy–Duty Turbines", L.B. Davis, Aug. 1996.

"39th GE Turbine State–of–the–Art Technology Seminar", Tab 9, "GE Gas Turbine Combustion Flexibility", M. A. Davi, Aug. 1996.

"39th GE Turbine State–of–the–Art Technology Seminar", Tab 10, "Gas Fuel Clean–Up System Design Considerations for GE Heavy–Duty Gas Turbines", C. Wilkes, Aug. 1996.

"39th GE Turbine State–of–the–Art Technology Seminar", Tab 11, "Integrated Control Systems for Advanced Combined Cycles", Chu et al., Aug. 1996.

"39th GE Turbine State–of–the–Art Technology Seminar", Tab 12, "Power Systems for the 21st Century "H"Gas Turbine Combined Cycles", Paul et al., Aug. 1996.

"39th GE Turbine State–of–the–Art Technology Seminar", Tab 13, "Clean Coal and Heavy Oil Technologies for Gas Turbines", D. M. Todd, Aug. 1996.

"39th GE Turbine State–of–the–Art Technology Seminar", Tab 14, "Gas Turbine Conversions, Modifications and Uprates Technology", Stuck et al., Aug. 1996.

"39th GE Turbine State–of–the–Art Technology Seminar", Tab 15, "Performance and Reliability Improvements for Heavy–Duty Gas Turbines,"J.R. Johnston, Aug. 1996.

"39th GE Turbine State–of–the–Art Technology Seminar", Tab 16, "Gas Turbine Repair Technology", Crimi et al, Aug. 1996.

"39th GE Turbine State–of–the–Art Technology Seminar", Tab 17, "Heavy Duty Turbine Operating & Maintenance Considerations", R. F. Hoeft, Aug. 1996.

"39th GE Turbine State–of–the–Art Technology Seminar", Tab 18, "Gas Turbine Performance Monitoring and Testing", Schmitt et al., Aug. 1996.

"39th GE Turbine State–of–the–Art Technology Seminar", Tab 19, "Monitoring Service Delivery System and Diagnostics", Madej et al., Aug. 1996.

"39th GE Turbine State–of–the–Art Technology Seminar", Tab 20, "Steam Turbines for Large Power Applications", Reinker et al., Aug. 1996.

"39th GE Turbine State–of–the–Art Technology Seminar", Tab 21, "Steam Turbines for Ultrasupercritical Power Plants", Retzlaff et al., Aug. 1996.

"39th GE Turbine State–of–the–Art Technology Seminar", Tab 22, "Steam Turbine Sustained Efficiency", P. Schofield, Aug. 1996.

"39th GE Turbine State–of–the–Art Technology Seminar", Tab 23, "Recent Advances in Steam Turbines for Industrial and Cogeneration Applications", Leger et al., Aug. 1996.

"39th GE Turbine State–of–the–Art Technology Seminar", Tab 24, "Mechanical Drive Steam Turbines", D. R. Leger, Aug. 1996.

"39th GE Turbine State–of–the–Art Technology Seminar", Tab 25, "Steam Turbines for STAG™ Combined–Cycle Power Systems", M. Boss, Aug. 1996.

"39th GE Turbine State–of–the–Art Technology Seminar", Tab 26, "Cogeneration Application Considerations", Fisk et al., Aug. 1996.

"39th GE Turbine State–of–the–Art Technology Seminar", Tab 27, "Performance and Economic Considerations of Repowering Steam Power Plants", Stoll et al., Aug. 1996.

"39th GE Turbine State–of–the–Art Technology Seminar", Tab 28, "High–Power–Density™ Steam Turbine Design Evolution", J. H. Moore, Aug. 1996.

"39th GE Turbine State–of–the–Art Technology Seminar", Tab 29, "Advances in Steam Path Technologies", Cofer, IV, et al., Aug. 1996.

"39th GE Turbine State–of–the–Art Technology Seminar", Tab 30, "Upgradable Opportunities for Steam Turbine", D. R. Dreier, Jr., Aug. 1996.

"39th GE Turbine State–of–the–Art Technology Seminar", Tab 31, "Uprate Options for Industrial Turbines", R. C. Beck, Aug. 1996.

"39th GE Turbine State–of–the–Art Technology Seminar", Tab 32, "Thermal Performance Evaluation and Assessment of Steam Turbine Units", P. Albert, Aug. 1996.

"39th GE Turbine State–of–the–Art Technology Seminar", Tab 33, "Advances in Welding Repair Technology", J. F. Nolan, Aug. 1996.

"39th GE Turbine State–of–the–Art Technology Seminar", Tab 34, "Operation and Maintenance Strategies to Enhance Plant Profitability", MacGillivray et al., Aug. 1996.

"39th GE Turbine State–of–the–Art Technology Seminar", Tab 35, "Generator Insitu Inspections", D. Stanton.

"39th GE Turbine State–of–the–Art Technology Seminar", Tab 36, "Generator Upgrade and Rewind", Halpern et al., Aug. 1996.

"39th GE Turbine State–of–the–Art Technology Seminar", Tab 37, "GE Combined Cycle Product Line and Performance"Chase, et al., Aug. 1996.

"39th GE Turbine State–of–the–Art Technology Seminar", Tab 38, "GE Combined Cycle Experience", Maslak et al., Aug. 1996.

"39th GE Turbine State–of–the–Art Technology Seminar", Tab 39, "Single–Shaft Combined Cycle Power Generation Systems", Tomlinson et al., Aug. 1996.

"Advanced Turbine System Program –Conceptual Design and Product Development", Annual Report, Sep. 1, 1994 – Aug. 31, 1995.

"Advanced Turbine Systems (ATS Program) –Conceptual Design and Product Development", Final Technical Progress Report, vol. 2–Industrial Machine, Mar. 31, 1997, Morgantown, WV.

"Advanced Turbine Systems (ATS Program), –Conceptual Design and Product Development", Final Technical Progress Report, Aug. 31, 1996, Morgantown, WV.

"Advanced Turbine Systems (ATS) Program, Phase 2, Conceptual Design and Product Development", Yearly Technical Progress Report, Reporting Period: Aug. 25, 1993 –Aug. 31, 1994.

"Advanced Turbine Systems" Annual Program Review, Preprints, Nov. 2–4, 1998, Washington, D.C. U.S. Department of Energy, Office of Industrial Techonlogies Federal Energy Technology Center.

"ATS Conference" Oct. 28, 1999, Slide Presentation.

"Baglan Bay Launch Site", various articles relating to Baglan Energy Park.

"Baglan Energy Park", Brochure.

"Commercialization", Del Williamson, Present, Global Sales, May 8, 1998.

"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17, 1998, Report Numbers DE–FC21–95MC31176—11.

"Exhibit panels used at 1995 product introduction at PowerGen Europe".

"Extensive Testing Program Validates High Efficiency, reliability of GE's Advanced "H"Gas Turbine Technology", Press Information, Press Release, 96–NR14, Jun. 26, 1996, H Technology Tests/pp. 1–4.

"Extensive Testing Program Validates High Efficiency, Reliability of GE's Advanced "H"Gas Turbine Technology", GE Introduces Advanced Gas Turbine Technology Platform: First to Reach 60% Combined–Cycle Power Plant Efficiency, Press Information, Press Release, Power–Gen Europe '95, 95–NRR15, Advanced Technology Introduction/pp. 1–6.

"Gas, Steam Turbine Work as Single Unit in GE's Advanced H Technology Combined–Cycle System", Press Information, Press Release, 95–NR18, May 16, 1995, Advanced Technology Introduction/pp. 1–3.

"GE Breaks 60% Net Efficiency Barrier" paper, 4 pages.

"GE Businesses Share Technologies and Experts to Develop State–Of–The–Art Products", Press Information, Press Release 95–NR10, May 16, 1995, GE Technology Transfer/pp. 1–3.

"General Electric ATS Program Technical Review, Phase 2 Activities", T. Chance et al., pp. 1–4.

"General Electric's DOE/ATS H Gas Turbine Development" Advanced Turbine Systems Annual Review Meeting, Nov. 7–8, 1996, Washington, D.C., Publication Release.

"H Technology Commercialization", 1998 MarComm Activity Recommendation, Mar. 1998.

"H Technology", Jon Ebacher, VP, Power Gen Technology, May 8, 1998.

"H Testing Process", Jon Ebacher, VP, Power Gen Technology, May 8, 1998.

"Heavy–Duty & Aeroderivative Products" Gas Turbines, Brochure, 1998.

"MS7001H/MS9001H Gas Turbine, gepower.com website for PowerGen Europe"Jun. 1–3 going public Jun. 15, (1995).

"New Steam Cooling System is a Key to 60% Efficiency For GE "H" Technology Combined–Cycle Systems", Press Information, Press Release, 95–NRR16, May 16, 1995, H Technology/pp. 1–3.

"Overview of GE's H Gas Turbine Combined Cycle", Jul. 1, 1995 to Dec. 31, 1997.

"Power Systems for the $21^{st}$ Century –"H" Gas Turbine Combined Cycles", Thomas C. Paul et al., Report.

"Power–Gen '96 Europe", Conference Programme, Budapest, Hungary, Jun. 26–28, 1996.

"Power–Gen International", 1998 Show Guide, Dec. 9–11, 1998, Orange County Convention Center, Orlando, Florida.

"Press Coverage following 1995 product announcement"; various newspaper clippings relating to improved generator.

"Proceedings of the Advanced Turbine Systems Annual Program Review Meeting", vol. I, "Industrial Advanced Turbine Systems Program Overview", D.W. Esbeck, pp. 3–13, Oct., 1995.

"Proceedings of the Advanced Turbine Systems Annual Program Review Meeting", vol. I, "H Gas Turbine Combined Cycle", J. Corman, pp. 14–21, Oct., 1995.

"Proceedings of the Advanced Turbine Systems Annual Program Review Meeting", vol. I, "Overview of Westinghouse's Advanced Turbine Systems Program", Bannister et al., pp. 22–30, Oct., 1995.

"Proceedings of the Advanced Turbine Systems Annual Program Review Meeting", vol. I, "Allison Engine ATS Program Technical Review,", D. Mukavetz, pp. 31–42, Oct., 1995.

"Proceedings of the Advanced Turbine Systems Annual Program Review Meeting", vol. I, "Advanced Turbine Systems Program Industrial System Concept Development", S. Gates, pp. 43–63, Oct., 1995.

"Proceedings of the Advanced Turbine Systems Annual Program Review Meeting", vol. I, "Advanced Turbine System Program Phase 2 Cycle Selection", Latcovich, Jr., pp. 64–69, Oct., 1995.

"Proceedings of the Advanced Turbine Systems Annual Program Review Meeting", vol. I, "General Electric ATS Program Technical Review Phase 2 Activities", Chance et al., pp. 70–74, Oct., 1995.

"Proceedings of the Advanced Turbine Systems Annual Program Review Meeting", vol. I, "Technical Review of Westinghouse's Advanced Turbine Systems Program", Diakunchak et al., pp. 75–86, Oct., 1995.

"Proceedings of the Advanced Turbine Systems Annual Program Review Meeting", vol. I, "Advanced Combustion Turbines and Cycles: An EPRI Perspective", Touchton et al., pp. 87–88, Oct., 1995.

"Proceedings of the Advanced Turbine Systems Annual Program Review Meeting", vol. I, "Advanced Turbine Systems Annual Program Review", William E. Koop pp. 89–92, Oct., 1995.

"Proceedings of the Advanced Turbine Systems Annual Program Review Meeting", vol. I, "The AGTSR Consortium: An Update", Fant et al., pp. 93–102, Oct., 1995.

"Proceedings of the Advanced Turbine Systems Annual Program Review Meeting", vol. I, "Overview of Allison/AGTSR Interactions", Sy A. Ali, pp. 103–106, Oct., 1995.

"Proceedings of the Advanced Turbine Systems Annual Program Review Meeting", vol. I, "Design Factors for Stable Lean Premix Combustion", Richards et al., pp. 107–113, Oct., 1995.

"Proceedings of the Advanced Turbine Systems Annual Program Review Meeting", vol. I, "Ceramic Stationary as Turbine", M. van Roode, pp. 114–147, Oct., 1995.

"Proceedings of the Advanced Turbine Systems Annual Program Review Meeting", vol. I, "DOE/Allison Ceramic Vane Effort", Wenglarz et al., pp. 148–151, Oct., 1995.

"Proceedings of the Advanced Turbine Systems Annual Program Review Meeting", vol. I, "Materials/Manufacturing Element of the Advanced Turbine Systems Program", Karnitz et al., pp. 152–160, Oct., 1995.

"Proceedings of the Advanced Turbine Systems Annual Program Review Meeting", vol. I, "Land–Based Turbine Casting Initiative", Mueller et al., pp. 161–170, Oct., 1995.

"Proceedings of the Advanced Turbine Systems Annual Program Review Meeting", vol. I, "Turbine Airfoil Manufacturing Technology", Kortovich, pp. 171–181, Oct., 1995.

"Proceedings of the Advanced Turbine Systems Annual Program Review Meeting", vol. I, "Advanced Turbine Systems Annual Program Review", William E. Koop, pp. 89–92, Oct, 1995.

"Proceedings of the Advanced Turbine Systems Annual Program Review Meeting", vol. I, "The AGTSR Consortium: An Update", Fant et al., pp. 93–102, Oct., 1995.

"Proceedings of the Advanced Turbine Systems Annual Program Review Meeting", vol. I, "Overview of Allison/AGTSR Interactions", Sy A. Ali, pp. 103–106, Oct., 1995.

"Proceedings of the Advanced Turbine Systems Annual Program Review Meeting", vol. I, "Design Factors for Stable Lean Premix Combustion", Richards et al., pp. 107–113, Oct., 1995.

"Proceedings of the Advanced Turbine Systems Annual Program Review Meeting", vol. I, "Ceramic Stationary as Turbine", M. van Roode, pp. 114–147, Oct., 1995.

"Proceedings of the Advanced Turbine Systems Annual Program Review Meeting", vol. I, "DOE/Allison Ceramic Vane Effort", Wenglarz et al., pp. 148–151, Oct., 1995.

"Proceedings of the Advanced Turbine Systems Annual Program Review Meeting", vol. I, "Materials/Manufacturing Element of the Advanced Turbine Systems Program", Karnitz et al., pp. 152–160, Oct., 1995.

"Proceedings of the Advanced Turbine Systems Annual Program Review Meeting", vol. I, "Land–Based Turbine Casting Initiative", Mueller et al., pp. 161–170, Oct., 1995.

"Proceedings of the Advanced Turbine Systems Annual Program Review Meeting", vol. I, "Turbine Airfol Manufacturing Technology", Kortovich, pp. 171–181, Oct., 1995.

"Proceedings of the Advanced Turbine Systems Annual Program Review Meeting", vol. I, "Pratt & Whitney Thermal Barrier Coatings", Bornstein et al., pp. 182–193, Oct., 1995.

"Proceedings of the Advanced Turbine Systems Annual Program Review Meeting", vol. I, "Westinhouse Thermal Barrier Coatings", Goedjen et al., pp. 194–199, Oct., 1995.

"Proceedings of the Advanced Turbine Systems Annual Program Review Meeting", vol. I, "High Performance Steam Development", Duffy et al., pp. 200–220, Oct., 1995.

"Proceedings of the Advanced Turbine Systems Annual Program Review Meeting", vol. II, "Lean Premixed Combustion Stabilized by Radiation Feedback and heterogeneous Catalysis", Dibble et al., pp. 221–232, Oct., 1995.

"Proceedings of the Advanced Turbine Systems Annual Program Review Meeting", vol. II, Rayleigh/Rama/LIF Measurements in a Turbulent Lean Premixed Combustor, Nandula et al. pp. 233–248, Oct., 1995.

"Proceedings of the Advanced Turbine Systems Annual Program Review Meeting", vol. II, "Lean Premixed Flames for Low $No_x$ Combustors", Sojka et al., pp. 249–275, Oct., 1995.

"Proceedings of the Advanced Turbine Systems Annual Program Review Meeting", vol. II, "Functionally Gradient Materials for Thermal Barrier Coatings in Advanced Gas Turbine Systems", Banovic et al., pp. 276–280, Oct., 1995.

"Proceedings of the Advanced Turbine Systems Annual Program Review Meeting", vol. II, "Advanced Turbine Cooling, Heat Transfer, and Aerodynamic Studies", Han et al., pp. 281–309, Oct., 1995.

"Proceedings of the Advanced Turbine Systems Annual Program Review Meeting", vol. II, "Life Prediction of Advanced Materials for Gas Turbine Application", Zamrik et al., pp. 310–327, Oct., 1995.

"Proceedings of the Advanced Turbine Systems Annual Program Review Meeting", vol. II, "Advanced Combustion Technologies for Gas Turbine Power Plants", Vandsburger et al., pp. 328–352, Oct., 1995.

"Proceedings of the Advanced Turbine Systems Annual Program Review Meeting", vol. II, "Combustion Modeling in Advanced Gas Turbine Sytems", Smoot et al., pp. 353–370, Oct., 1995.

"Proceedings of the Advanced Turbine Systems Annual Program Review Meeting", vol. II, "Heat Transfer in a Two–Pass Internally Ribbed Turbine Blade Coolant Channel with Cylindrical Vortex Generators", Hibbs et al. pp. 371–390, Oct., 1995.

"Proceedings of the Advanced Turbine Systems Annual Program Review Meeting", vol. II, "Rotational Effects on Turbine Blade Cooling", Govatzidakia et al., pp. 391–392, Oct., 1995.

"Proceedings of the Advanced Turbine Systems Annual Program Review Meeting", vol. II, "Manifold Methods for Methane Combustion", Yang et al., pp. 393–409, Oct., 1995.

"Proceedings of the Advanced Turbine Systems Annual Program Review Meeting", vol. II, "Advanced Multistage Turbine Blade Aerodynamics, Performance, Cooling, and Heat Transfer", Fleeter et al., pp. 410–414, Oct., 1995.

"Proceedings of the Advanced Turbine Systems Annual Program Review Meeting", vol. II, The Role of Reactant Unmixedness, Strain Rate, and Length Scale on Premixed Combustor Performance, Samuelsen et al., pp. 415–422, Oct., 1995.

"Proceedings of the Advanced Turbine Systems Annual Program Review Meeting", vol. II, "Experimental and Computational Studies of Film Cooling With Compound Angle Injection", Goldstein et al., pp. 423–451, Oct., 1995.

"Proceedings of the Advanced Turbine Systems Annual Program Review Meeting", vol. II, "Compatibility of Gas Turbine Materials with Steam Cooling", Desai et al., pp. 452–464, Oct., 1995.

"Proceedings of the Advanced Turbine Systems Annual Program Review Meeting", vol. II, "Use of a Laser–Induced Fluorescence Thermal Imaging System for Film Cooling Heat Transfer Measurement", M. K. Chyu, pp. 465–473, Oct., 1995.

"Proceedings of the Advanced Turbine Systems Annual Program Review Meeting", vol. II, Effects of Geometry on Slot–Jet Film Cooling Performance, Hyams et al., pp. 474–496 Oct., 1995.

"Proceedings of the Advanced Turbine Systems Annual Program Review Meeting", vol. II, "Steam as Turbine Blade Coolant: Experimental Data Generation", Wilmsen et al., pp. 497–505, Oct., 1995.

"Proceedings of the Advanced Turbine Systems Annual Program Review Meeting", vol. II, "Combustion Chemical Vapor Deposited Coatings for Thermal Barrier Coating Systems", Hampikian et al., pp. 506–515, Oct., 1995.

"Proceedings of the Advanced Turbine Systems Annual Program Review Meeting", vol. II, "Premixed Burner Experiments: Geometry, Mixing, and Flame Structure Issues", Gupta et al., pp. 516–528, Oct., 1995.

"Proceedings of the Advanced Turbine Systems Annual Program Review Meeting", vol. II, "Intercooler Flow Path for Gas Turbines: CFD Design and Experiments", Agrawal et al., pp. 529–538, Oct., 1995.

"Proceedings of the Advanced Turbine Systems Annual Program Review Meeting", vol. II, "Bond Strength and Stress Measurements in Thermal Barrier Coatings", Gell et al., pp. 539–549, Oct., 1995.

"Proceedings of the Advanced Turbine Systems Annual Program Review Meeting", vol. II, "Active Control of Combustion Instabilities in Low $NO_x$ Gas Turbines", Zinn et al., pp. 550–551, Oct., 1995.

"Proceedings of the Advanced Turbine Systems Annual Program Review Meeting", vol. II, "Combustion Instability Modeling and Analysis", Santoro et al., pp. 552–559, Oct., 1995.

"Proceedings of the Advanced Turbine Systems Annual Program Review Meeting", vol. II, "Flow and Heat Transfer in Gas Turbine Disk Cavities Subject to Nonuniform External Pressure Field", Roy et al., pp. 560–565, Oct., 1995.

"Proceedings of the Advanced Turbine Systems Annual Program Review Meeting", vol. II, "Heat Pipe Turbine Vane Cooling", Langston et al., pp. 566–572, Oct., 1995.

"Proceedings of the Advanced Turbine Systems Annual Program Review Meeting", vol. II, "Improved Modeling Techniques for Turbomachinery Flow Fields", Lakshminarayana et al., pp. 573–581, Oct., 1995.

"Proceedings of the Advanced Turbine Systems Annual Program Review Meeting", vol. II, "Advanced 3D Inverse Method for Designing Turbomachine Blades", T. Dang, p. 582, Oct., 1995.

"Proceedings of the Advanced Turbine Systems Annual Program Review Meeting", "ATS and the Industries of the Future", Denise Swink, p. 1, Nov., 1996.

"Proceedings of the Advanced Turbine Systems Annual Program Review Meeting", "Gas Turbine Association Agenda", William H. Day, pp. 3–16, Nov., 1996.

"Proceedings of the Advanced Turbine Systems Annual Program Review Meeting", "Power Needs in the Chemical Industry", Keith Davidson, pp. 17–26, Nov., 1996.

"Proceedings of the Advanced Turbine Systems Annual Program Review Meeting", "Advanced Turbine Systems Program Overview", David Esbeck, pp. 27–34, Nov., 1996.

"Proceedings of the Advanced Turbine Systems Annual Program Review Meeting", "Westinghouse's Advanced Turbine Systems Program", Gerard McQuiggan, pp. 35–48, Nov., 1996.

"Proceedings of the Advanced Turbine Systems Annual Program Review Meeting", "Overview of GE's H Gas Turbine Combined Cycle", Cook et al., pp. 49–72, Nov., 1996.

"Proceedings of the Advanced Turbine Systems Annual Program Review Meeting", "Allison Advanced Simple Cycle Gas Turbine System", William D. Weisbrod, pp. 73–94, Nov., 1996.

"Proceedings of the Advanced Turbine Systems Annual Program Review Meeting", "The AGTSR Industry–University Consortium", Lawrence P. Golan, pp. 95–110, Nov., 1996.

"Proceedings of the Advanced Turbine Systems Annual Program Review Meeting", "$NO_x$ and CO Emissions Models for Gas–Fired Lean–Premixed Combustion Turbines", A. Mellor, pp. 111–122, Nov., 1996.

"Proceedings of the Advanced Turbine Systems Annual Program Review Meeting", "Methodologies for Active Mixing and Combustion Control", Uri Vandsburger, pp. 123–156, Nov., 1996.

"Proceedings of the Advanced Turbine Systems Annual Program Review Meeting", "Combustion Modeling in Advanced Gas Turbine Systems", Paul O. Hedman, pp. 157–180, Nov., 19967.

"Proceedings of the Advanced Turbine Systems Annual Program Review Meeting", "Manifold Methods for Methane Combustion", Stephen B. Pope, pp. 181–188, Nov., 1996.

"Proceedings of the Advanced Turbine Systems Annual Program Review Meeting", "The Role of Reactant Unmixedness, Strain Rate, and Length Scale on Premixed Combustor Performance", Scott Samuelsen, pp. 189–210, Nov., 1996.

"Proceedings of the Advanced Turbine Systems Annual Program Review Meeting", "Effect of Swirl and Momentum Distribution on Temperature Distribution in Premixed Flames", Ashwani K. Gupta, pp. 211–232, Nov., 1996.

"Proceedings of the Advanced Turbine Systems Annual Program Review Meeting", "Combustion Instability Studies Application to Land–Based Gas Turbine Combustors", Robert J. Santoro, pp. 233–252.

"Proceedings of the Advanced Turbine Systems Annual Program Review Meeting", Active Control of Combustion Instabilities in Low $NO_x$ Turbines, Ben T. Zinn, pp. 253–264, Nov., 1996.

"Proceedings of the Advanced Turbine Systems Annual Program Review Meeting", "Life Prediction of Advanced Materials for Gas Turbine Application," Sam Y. Zamrik, pp. 265–274, Nov., 1996.

"Proceedings of the Advanced Turbine Systems Annual Program Review Meeting", "Combustion Chemical Vapor Deposited Coatings for Thermal Barrier Coating Systems", W. Brent Carter, pp. 275–290, Nov., 1996.

"Proceedings of the Advanced Turbine Systems Annual Program Review Meeting", "Compatibility of Gas Turbine Materials with Steam Cooling", Vimal Desai, pp. 291–314, Nov., 1996.

"Proceedings of the Advanced Turbine Systems Annual Program Review Meeting", "Bond Strength and Stress Measurements in Thermal Barrier Coatings", Maurice Gell, pp. 315–334, Nov., 1996.

"Proceedings of the Advanced Turbine Systems Annual Program Review Meeting", "Advanced Multistage Turbine Blade Aerodynamics, Performance, Cooling and Heat Transfer", Sanford Fleeter, pp. 335–356, Nov., 1996.

"Proceedings of the Advanced Turbine Systems Annual Program Review Meeting", "Flow Characteristics of an Intercooler System for Power Generating Gas Turbines", Ajay K. Agrawal, pp. 357–370, Nov., 1996.

"Proceedings of the Advanced Turbine Systems Annual Program Review Meeting", "Improved Modeling Techniques for Turbomachinery Flow Fields", B. Lakshminarayana, pp. 371–392, Nov., 1996.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, pp. 393–406, Nov., 1996.

"Proceedings of the Advanced Turbine Systems Annual Program Review Meeting", "Advanced Turbine Cooling, Heat Transfer, and Aerodynamic Studies", Je–Chin Han, pp. 407–426, Nov., 1996.

"Proceedings of the Advanced Turbine Systems Annual Program Review Meeting", "Heat Transfer in a Two–Pass Internally Ribbed Turbine Blade Coolant Channel with Vortex Generators", S. Acharya, pp. 427–446.

"Proceedings of the Advanced Turbine Systems Annual Program Review Meeting", "Experimental and Computational Studies of Film Cooling with Compound Angle Injection", R. Goldstein, pp. 447–460, Nov., 1996.

"Proceedings of the Advanced Turbine Systems Annual Program Review Meeting", "Study of Endwall Film Cooling with a Gap Leakage Using a Thermographic Phosphor Fluorescence Imaging System", Mingking K. Chyu, pp. 461–470, Nov., 1996.

"Proceedings of the Advanced Turbine Systems Annual Program Review Meeting", "Steam as a Turbine Blade Coolant: External Side Heat Transfer", Abraham Engeda, pp. 471–482, Nov., 1996.

"Proceedings of the Advanced Turbine Systems Annual Program Review Meeting", "Flow and Heat Transfer in Gas Turbine Disk Cavities Subject to Nonuniform External Pressure Field", Ramendra Roy, pp. 483–498, Nov., 1996.

"Proceedings of the Advanced Turbine Systems Annual Program Review Meeting", "Closed–Loop Mist/Steam Cooling for Advanced Turbine Systems", Ting–Wang, pp. 499–512, Nov., 1996.

"Proceedings of the Advanced Turbine Systems Annual Program Review Meeting", "Heat Pipe Turbine Vane Cooling", Langston et al., pp. 513–534, Nov., 1996.

"Proceedings of the Advanced Turbine Systems Annual Program Review Meeting", "EPRI's Combustion Turbine Program: Status and Future Directions", Arthur Cohn, pp. 534,–552 Nov., 1996.

"Proceedings of the Advanced Turbine Systems Annual Program Review Meeting", "ATS Materials Support", Michael Karnitz, pp. 553–576, Nov., 1996.

"Proceedings of the Advanced Turbine Systems Annual Program Review Meeting", "Land Based Turbine Casting Initiative", Boyd A. Mueller, pp. 577–592, Nov., 1996.

"Proceedings of the Advanced Turbine Systems Annual Program Review Meeting", "Turbine Airfoil Manufacturing Technology", Charles S. Kortovich, pp. 593–622, Nov., 1996.

"Proceedings of the Advanced Turbine Systems Annual Program Review Meeting", "Hot Corrosion Testing of TBS's", Norman Bornstein, pp. 623–631, Nov., 1996.

"Proceedings of the Advanced Turbine Systems Annual Program Review Meeting", "Ceramic Stationary Gas Turbine", Mark van Roode, pp. 633–658, Nov., 1996.

"Proceedings of the Advanced Turbine Systems Annual Program Review Meeting", "Western European Status of Ceramics for Gas Turbines", Tibor Bornemisza, pp. 659–670, Nov., 1996.

"Proceedings of the Advanced Turbine Systems Annual Program Review Meeting", "Status of Ceramic Gas Turbines in Russia", Mark van Roode, p. 671, Nov., 1996.

"Status Report: The U.S. Department of Energy's Advanced Turbine systems Program", facsimile dated Nov., 7, 1996.

"Testing Program Results Validate GE's H Gas Turbine – High Efficiency, Low Cost of Electricity and Low Emission", Roger Schonewald and Patrick Marolda, (no date available).

"Testing Program Results Validate GE's H Gas Turbine – High Efficiency, Low Cost of Electricity and Low Emissions", Slide Presentation –working draft, (no date available).

"The Next Step In H. . . For Low Cost Per kW–Hour Power Generation", LP–1PGE '98.

"Utility Advanced Turbine System (ATS) Technology Readiness Testing and Pre–Commercialization Demonstration", Document #486040, Oct. 1 –Dec. 31, 1996, Publication Date, Jun. 1, 1997, Report Numbers: DOE/MC/31176—5628.

"Utility Advanced Turbine System (ATS) Technology Readiness Testing—Phase 3", Document #666274, Oct. 1, 1996–Sep. 30, 1997, Publication Date, Dec. 31, 1997, Report Numbers: DOE/MC/31176–10.

"Utility Advanced Turbine System (ATS) Technology Readiness Testing and Pre–Commercial Demonstration, Phase 3", Document #486029, Oct. 1 –Dec. 31, 1995, Publication Date, May 1, 1997, Report Numbers: DOE/MC/31176—5340.

"Utility Advanced Turbine System (ATS) Technology Readiness Testing and Pre–Commercial Demonstration – Phase 3", Document #486132, Apr. 1 –Jun. 30, 1976, Publication Date, Dec. 31, 1996, Report Numbers: DOE/MC/31176—5660.

"Utility Advanced Turbine System (ATS) Technology Readiness Testing and Pre–Commercial Demonstration — Phase 3", Document #587906, Jul. 1 –Sep. 30, 1995, Publication Date, Dec. 31, 1995, Report Numbers: DOE/MC/31176—5339.

"Utility Advanced Turbine System (ATS) Technology Readiness Testing and Pre–Commercial Demonstration" Document #666277, Apr. 1 –Jun. 30, 1997, Publication Date, Dec. 31, 1997, Report Numbers: DOE/MC/31176—8.

"Utility Advanced Turbine System (ATS) Technology Readiness Testing and Pre–Commercial Demonstration" Jan. 1 –Mar. 31, 1996, DOE/MC/31176—5338.

"Utility Advanced Turbine System (ATS) Technology Readiness Testing.", Document #656823, Jan. 1 –Mar. 31, 1998, Publication Date, Aug. 1, 1998, Report Numbers: DOE/MC/31176–17.

"Utility Advanced Turbine System (ATS) Technology Readiness Testing and Pre–Commercial Demonstration", Annual Technical Progress Report, Reporting Period: Jul. 1, 1995 –Sep. 30, 1996.

"Utility Advanced Turbine System (ATS) Technology Readiness Testing", Phase 3R, Annual Technical Progress Report, Reporting Period: Oct. 1, 1997 –Sep. 30, 1998.

"Utility Advanced Turbine System (ATS) Technology Readiness Testing", Document #750405, Oct. 1 –Dec. 30, 1998, Publication Date: May, 1, 1999, Report Numbers: DE–FC21–95MC31176–20.

"Utility Advanced Turbine System (ATS) Technology Readiness Testing", Document #1348, Apr. 1 –Jun. 29, 1998, Publication Date Oct. 29, 1998, Report Numbers DE–FC21–95MC31176—18.

"Utility Advanced Turbine System (ATS) Technology Readiness Testing –Phase 3", Annual Technical Progress Report, Reporting Period: Oct. 1, 1996 –Sep. 30, 1997.

"Utility Advanced Turbine System (ATS) Technology Readiness Testing and Pre–Commercial Demonstration", Quarterly Report, Jan. 1 –Mar. 31, 1997, Document #666275, Report Numbers: DOE/MC/31176–07.

"Proceedings of the 1997 Advanced Turbine Systems", Annual Program Review Meeting, Oct. 28–29, 1997.

* cited by examiner

COMPRESSOR DISCHARGE BLEED AIR CIRCUIT IN GAS TURBINE PLANTS AND RELATED METHOD

This application is a continuation of application Ser. No. 09/659,687, filed Sep. 11, 2000, U.S. Pat. No. 6,442,941 the entire content of which is hereby incorporated by reference in this application.

This invention was made with Government support under Contract No. DE-FC21-95MC31176 awarded by the Department of Energy. The Government has certain rights in this invention.

BACKGROUND OF THE INVENTION

In some gas turbine applications, there are instances of gas turbine plant operation where the gas turbine pressure ratio reaches the operating pressure ratio limit of the compressor, resulting in compressor surge. These instances may arise in applications where low-Btu fuels or any other fuels with large amounts of diluent injection are used, and/or at cold ambient temperature conditions. The compressor pressure ratio is typically larger than the turbine pressure ratio in that the latter is subject to pressure loss in the turbine combustor.

One common solution that has been used to provide compressor pressure ratio protection is the bleeding off of gas turbine compressor discharge air and recirculating the bleed air back to the compressor inlet. This method of gas turbine operation, known as Inlet Bleed Heat (IBH) Control, raises the inlet temperature of the compressor inlet air by mixing the colder ambient air with the bleed portion of the hot compressor discharge air, thereby reducing the air density and the mass flow to the gas turbine. While this approach eliminates compressor surge, it also reduces turbine output both for the simple cycle operation as well as for combined cycle operation. In the latter case, the reduced gas turbine exhaust flow produces less steam in the Heat Recovery Steam Generator (HRSG) and consequently less steam turbine output. IBH also reduces the thermal efficiency of the gas turbine due to the loss of energy in throttling the compressed air.

BRIEF SUMMARY OF THE INVENTION

This invention provides an improved compressor bleed air method for providing compressor pressure ratio protection, which results in improved output and efficiency of a simple or combined cycle gas turbine power plant (as compared to the IBH approach). This invention is mostly, but not specifically, applicable to gas turbines utilizing standard diffusion flame combustors.

Two embodiments are disclosed herein. Each has applicability to both simple and combined cycle systems.

In a first embodiment, the invention includes bleeding off enough gas turbine compressor discharge air to maintain the compressor pressure ratio limit, and mixing it with the gas turbine (GT) exhaust in a simple cycle system, or at an appropriate location in a combined cycle system (e.g., in the HRSG stack where the two streams have minimum temperature difference). This technique does not increase compressor inlet temperature, and thus does not reduce output as in the case of the IBH approach.

In a second embodiment, where the compressor bleed function is activated for a large percentage of the gas turbine operating period, the method is similar to that described above, except that it uses an air expander device to recover the excess energy associated with the difference between the compressor air discharge pressure and GT exhaust stack (or HRSG) pressure. In addition to the power output increases, this method also results in higher power plant efficiency. In this second embodiment, a portion of the compressor discharge bleed air may bypass the expander via a throttling device to combine with the discharge stream from the expander, to thereby enable plant operation during start up, shut down and during the events when the expander is not operating.

The following are additional optional modifications which may be selected (individually or in an appropriate combination, in both simple and combined cycle operations) based on the economic benefits for a given application. The high pressure bleed air from the compressor is further heated, if required, by means of a pre-heater prior to introduction in the air expander to improve the expander output. The source of this heat can be thermal energy recovered either upstream, such as in the example case of a gasifier with high temperature cooler, or downstream such as the exhaust gas heat recovered from the gas turbine exhaust in a waste heat boiler. Alternatively, the source of heat may include combustion of air and fuel separately supplied to the pre-heater.

In its broader aspects, therefore, the invention relates to a simple cycle gas turbine system comprising: a compressor, a turbine component and a load, wherein fuel and compressor discharge air are supplied to a combustor and gaseous products of combustion are introduced into the turbine component and subsequently exhausted to atmosphere; and a compressor discharge bleed air circuit that removes bleed air from the compressor and supplies one portion of the bleed air to the combustor and another portion of the bleed air to an exhaust stack of the turbine component.

DETAILED DESCRIPTION OF THE INVENTION

Figure 1:
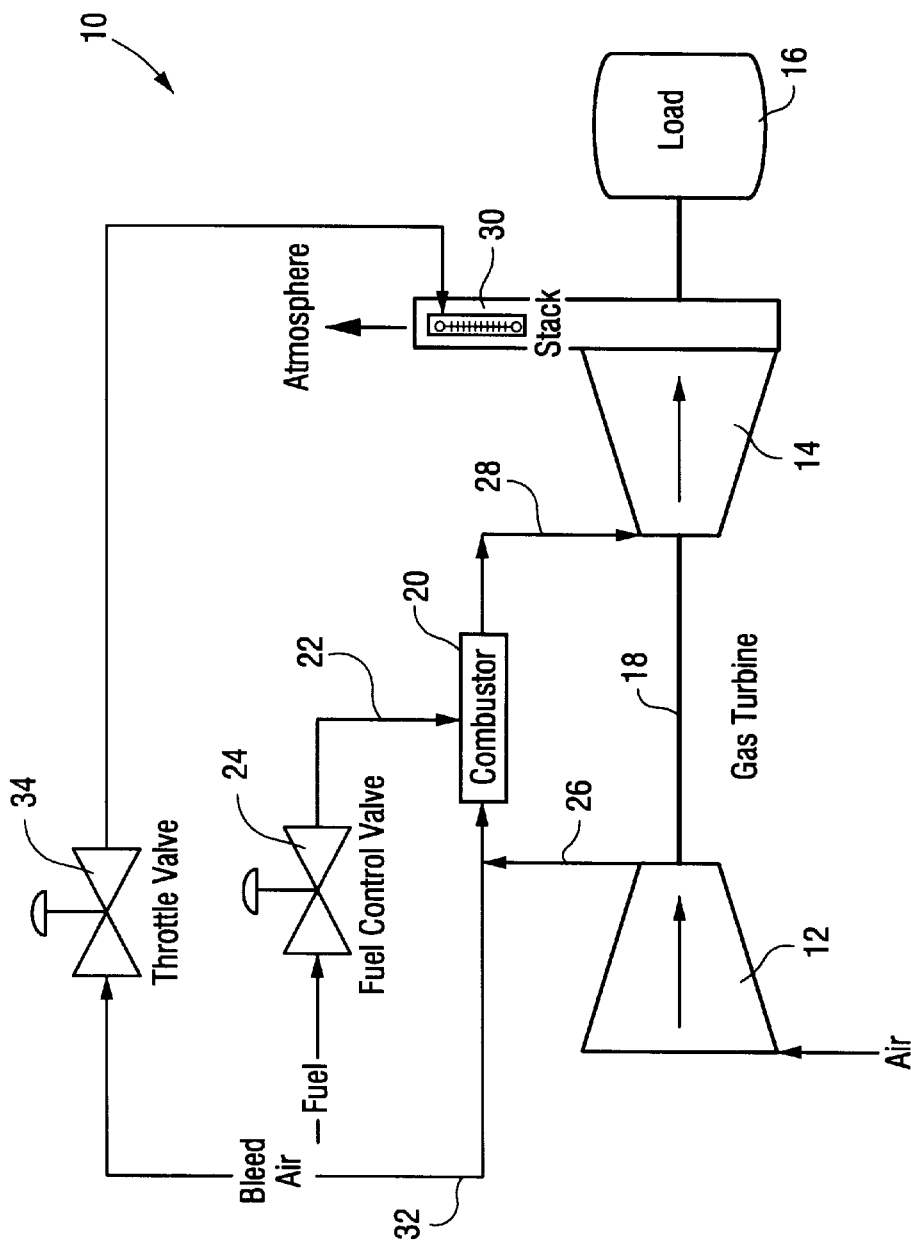
FIG. 1 is a schematic diagram of a simple cycle gas turbine with compressor bleed air to an exhaust stack in accordance with the invention.

With reference to FIG. 1, the simple cycle gas turbine system 10 includes a compressor 12, a turbine component 14 and a load (e.g., a generator) 16 arranged on a single rotor or shaft 18. A combustor 20 of the gas turbine receives fuel via stream 22 and control valve 24, as well as hot discharge air bled off from the compressor 12 via stream 26. Combustion gases are introduced into the turbine component 14 via stream 28.

During potential compressor surge conditions, a compressor discharge bleed air circuit is utilized. This circuit causes some of the compressor discharge bleed air to bypass the combustor and directs this bleed air directly to the gas turbine exhaust stack 30 via stream 32 and throttle valve 34, the valve 34 also controlling the amount of discharge air introduced into the combustor 20.

By extracting sufficient compressor discharge bleed air and feeding it directly to the gas turbine exhaust stack 30, the compressor pressure ratio limit is protected while, at the same time, there is no increase in the compressor inlet air temperature, and thus no loss of turbine output.

Figure 2:
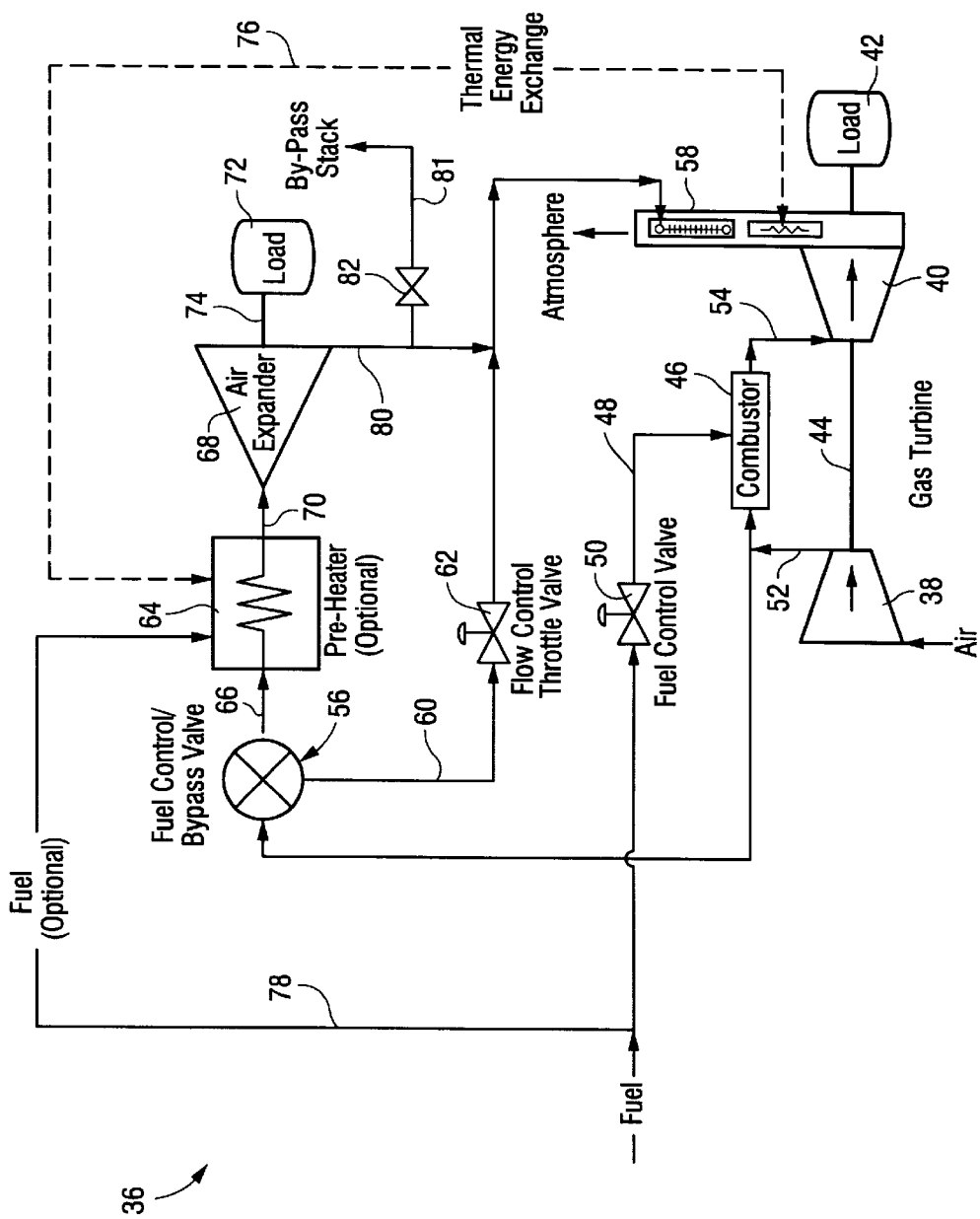
FIG. 2 is a schematic diagram of a simple cycle gas turbine with compressor bleed air pressure energy recovery in accordance with the invention.
Figure 3:
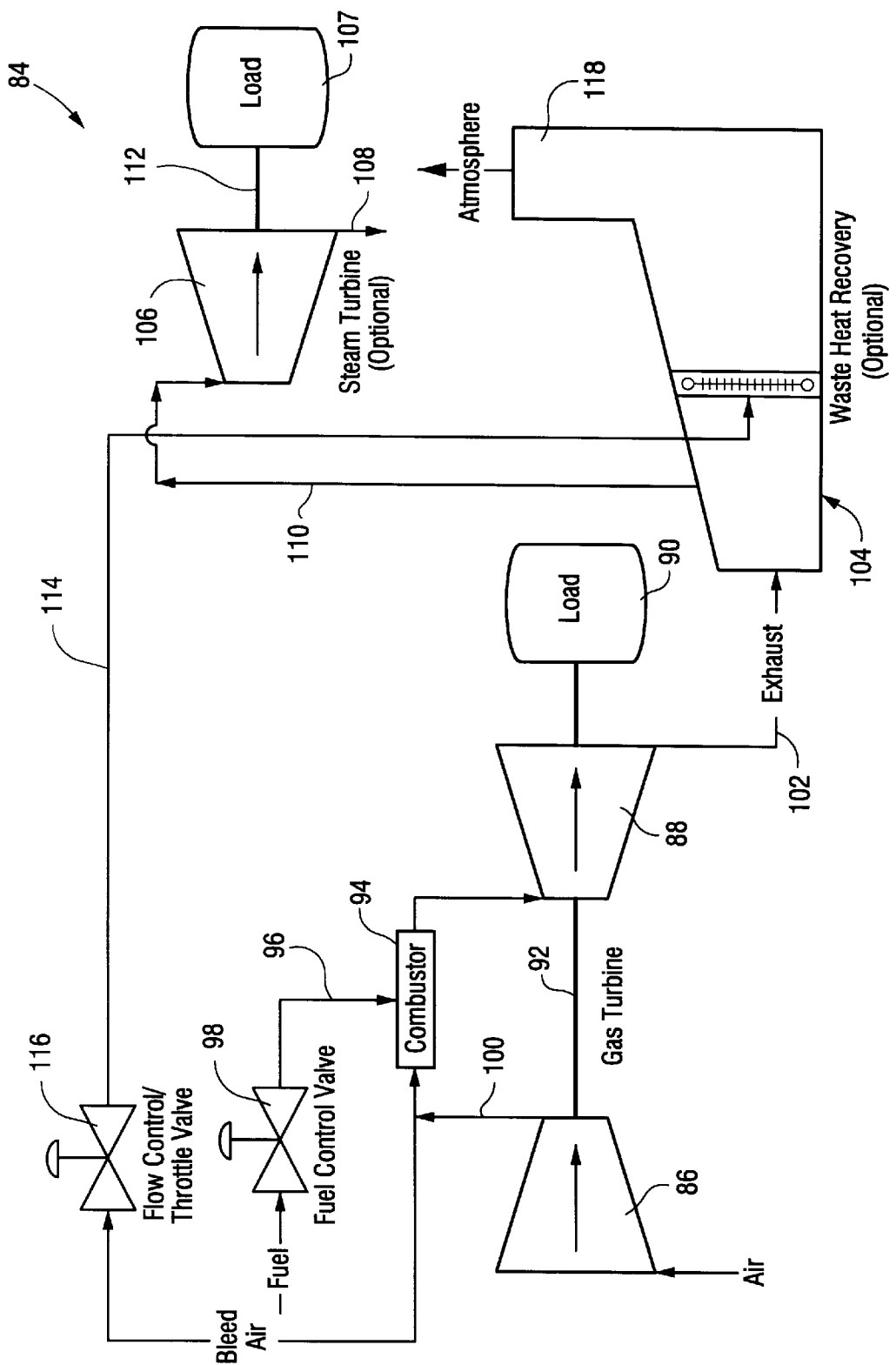
FIG. 3 is a schematic diagram of a combined cycle gas turbine with compressor bleed air to a heat recovery steam generator.

In FIG. 2, an arrangement is illustrated that is particularly beneficial when the compressor bleed air function is employed for a large percentage of the gas turbine operating period. In this embodiment, the gas turbine system 36 includes a compressor 38, a turbine component 40 and a load (e.g., a generator) 42, arranged on a single rotor or shaft 44. The combustor 46 receives fuel via stream 48 and fuel control valve 50; and compressor discharge air from the compressor 38 via stream 52. Combustion gases are introduced into the turbine component 40 via stream 54. A predetermined percentage of the compressor discharge air is bled to a flow control/bypass valve 56. During potential compressor surge conditions, valve 56 supplies compressor discharge bleed air to an air expander 68 via stream 70, and the air representing the difference between the compressor air discharge pressure and the gas turbine exhaust pressure, is then used to drive a secondary load 72 (e.g., a generator) via shaft 74. Optionally, the valve 56 can adjustably divert the compressor discharge bleed air to the gas turbine exhaust stack 58 via stream 60 and flow control throttle valve 62. This is useful as a bypass scheme (bypassing expander 68) to continue plant operation during start-up, shut-down and other events when the expander is not operating.

In an alternative arrangement, valve 56 may supply the compressor discharge bleed air to a pre-heater 64 via stream 66. Pre-heater 64 heats the bleed air by heat exchange with turbine exhaust air fed to the pre-heater 64 via stream 76. The heated bleed air is then expanded as described above. The pre-heater 64, optionally, may be fired using fuel separately introduced via stream 78. Excess air from the expander 68 is introduced into stream 60 via stream 80 and then to the gas turbine exhaust stack 58. Some percentage of this excess air may be allowed to bypass the stack 58 and escape to atmosphere upstream of the stack 58 via stream 81 and valve 82.

During potential compressor surge conditions, a portion of the compressor discharge air is supplied to the HRSG 104 via stream 114 and flow control/throttle valve 116, where it mixes with the gas turbine exhaust before being released to atmosphere via the HRSG exhaust stack 118. As in the embodiment shown in FIG. 1, this arrangement does not result in an increase in compressor inlet air temperature, thus allowing the compressor to enjoy the full benefit of low ambient temperatures (or other factors that also produce compressor surge).

Figure 4:
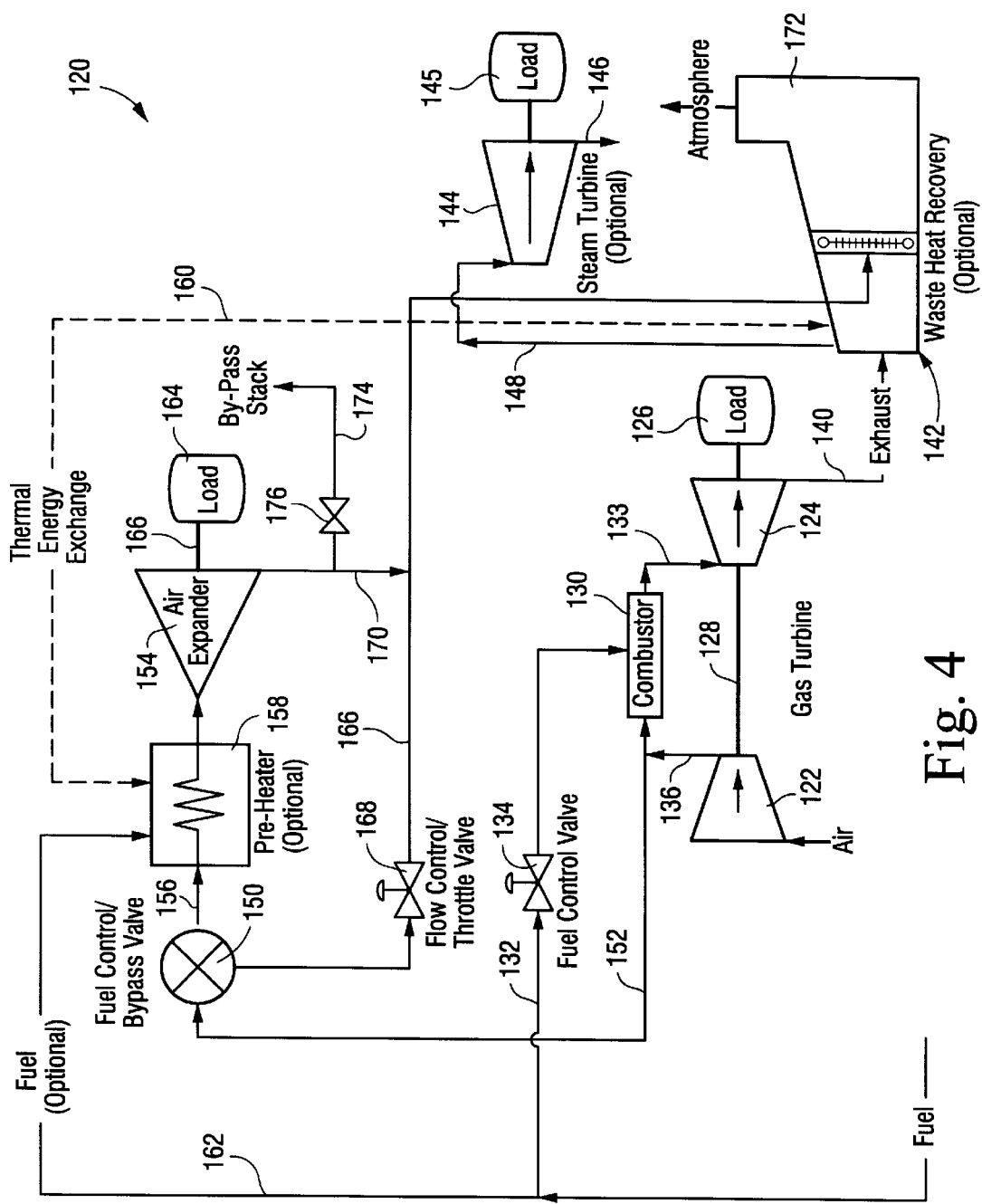
FIG. 4 is a schematic diagram of a combined cycle gas turbine with compressor bleed air pressure energy recovery.

Turning now to FIG. 4, an arrangement is shown that is applicable to combined cycle systems and uses an air expander to recover energy associated with the difference between the compressor discharge air pressure and the HRSG pressure. This combined cycle system 120 includes a gas turbine having a compressor 122, a turbine component 124 and a load (e.g., a generator) 126 arranged on a single shaft 128. Combustor 130 receives fuel via stream 132 and fuel control valve 134, along with compressor discharge air from the compressor 122 via stream 136. Combustion gases from the combustor 130 are introduced into the turbine 124 via stream 138. The gas turbine exhaust is supplied via stream 140 to an HRSG 142 for reheating steam from the steam turbine 144. Condensed steam from the steam turbine 144 is supplied to the HRSG 142 via stream 146, and the reheated steam is returned to the steam turbine 144 via stream 148. Steam turbine 144 drives a generator 145.

During potential compressor surge conditions, a predetermined percentage of the compressor discharge air is bled to a flow control/bypass valve 150 via stream 152. Valve 150 supplies the bleed air to the expander 154 via stream 156. Optionally, the bleed air can first be supplied to a pre-heater 158 via stream 156. The pre-heater 158 heats the compressor discharge bleed air via heat exchange with gas turbine exhaust in the HRSG via stream 160. The pre-heater 158, optionally, may be fired using fuel introduced via stream 162. The heated compressor discharge bleed air is then expanded in the air expander 154 and the excess air is used to drive a third load (e.g., a generator) 164 via shaft 166. During start-up, shut-down or other events when the expander is not operating, the valve 150 may divert the compressor discharge bleed air to the HRSG 142 via stream 166 and flow control/throttle valve 168, thus bypassing the pre-heater 158 and expander 154. When in service, air from the expander 154 is dumped into the stream 166 upstream of the HRSG 142, via stream 170. It is eventually exhausted to atmosphere through the HRSG stack 172. Some percentage of this air may bypass the HRSG 142 and escape to atmosphere via stream 174 and valve 176.

It is significant that the compressor discharge bleed air circuits described above are useful under conditions that lead to compressor surge, i.e., low ambient air temperatures; excess flow to the turbine; use of fuels with low heat content, etc. By channeling the compressor bleed air downstream of the compressor, there is no increase in compressor inlet temperature and attendant loss of input as with the IBH approach. With higher ambient temperatures, flow is reduced and there is typically no danger of compressor surge, so that the bleed air techniques of this invention are not required.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A gas turbine system comprising: a compressor, a turbine component and a load, wherein fuel and compressor discharge air are supplied to a combustor and gaseous products of combustion are introduced into the turbine component and subsequently exhausted to atmosphere; and a compressor discharge bleed air circuit that includes a flow control/bypass valve arranged to supply one portion of the compressor discharge air to the combustor and another portion of the compressor discharge air, selectively, to an expander or directly to an exhaust stack of the turbine component.

2. The system of claim 1 wherein said compressor discharge bleed air circuit includes a throttle valve for controlling flow of said another portion of the compressor discharge air directly to the exhaust stack.

3. The system of claim 1 wherein said compressor, turbine component and load are on a single shaft.

4. The system of claim 1 wherein, when said flow control/bypass valve is enabled to divert said another portion of the compressor discharge air to the air expander, said another portion of the compressor discharge air is introduced into a pre-heater upstream of said expander.

5. The system of claim 1 wherein, when said flow control/bypass valve is enabled to divert said another portion of the compressor discharge air to the air expander, said another portion of the compressor discharge air discharged from said expander is introduced into said exhaust stack.

6. The system of claim 1 wherein said another portion of the compressor discharge air is bypassed around the expander to enable turbine operation during start-up and shut-down.

7. A method of avoiding compressor surge under low ambient temperature conditions in a gas turbine operating system that includes a compressor, a turbine component and a load, the method comprising:

a. supplying one portion of discharge air from the compressor to a combustor of the gas turbine; and b. supplying another portion of the compressor discharge air selectively, to an expander upstream of an exhaust stack of said turbine component to thereby avoid compressor surge without increasing compressor inlet air temperature, or, bypassing said expander, directly to said exhaust stack.

8. The method of claim 7 wherein bypassing said another portion of the compressor discharge air around said expander is implemented during startup and shut down.

9. The method of claim 7 including using some of the compressor discharge air exiting the expander to drive another load.

* * * * *